(No Model.) 2 Sheets—Sheet 1.
C. O'NEILL & J. LINSTROM.
COMBINED LAWN RAKE AND GRASS CARRIER.
No. 432,168. Patented July 15, 1890.
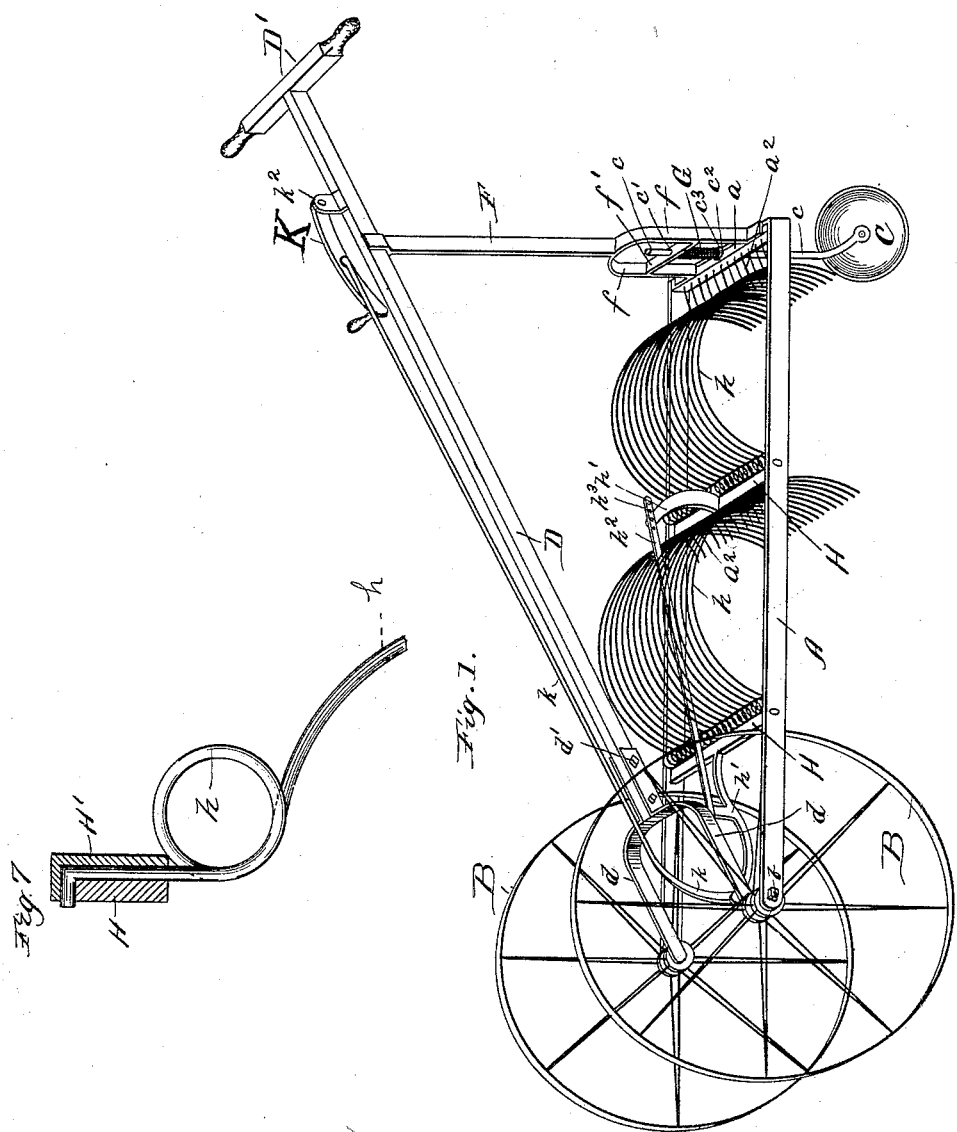
Witnesses:
J. H. Fitzgerald
J. C. O'Shea
Inventors
Charles O'Neill
John Linstrom
By M. J. Dougherty
their Attorney.

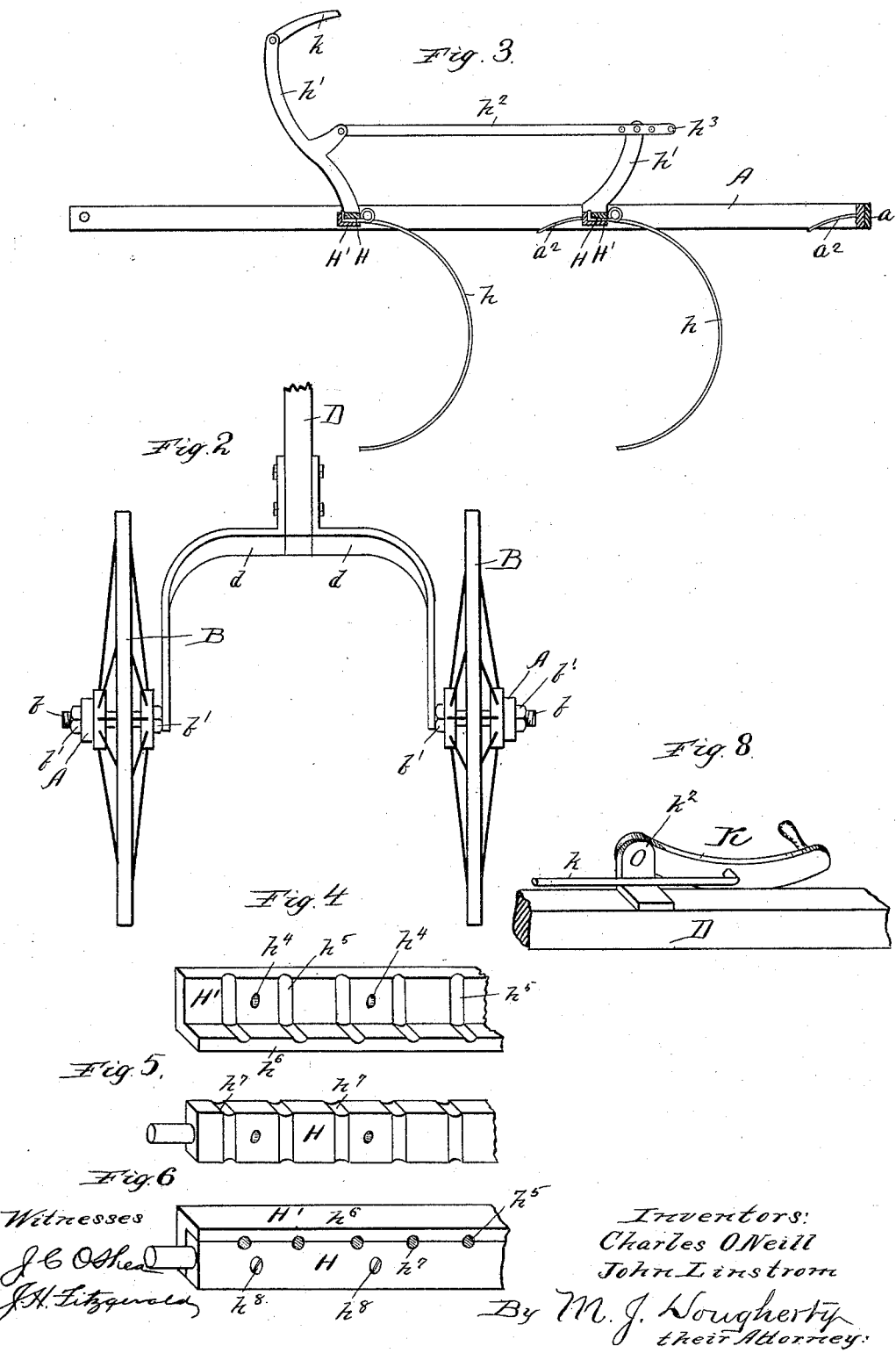

UNITED STATES PATENT OFFICE.

CHARLES O'NEILL AND JOHN LINSTROM, OF GALESBURG, ILLINOIS.

COMBINED LAWN-RAKE AND GRASS-CARRIER.

SPECIFICATION forming part of Letters Patent No. 432,168, dated July 15, 1890.

Application filed November 4, 1889. Serial No. 329,195. (No model.)

*To all whom it may concern:*

Be it known that we, CHARLES O'NEILL and JOHN LINSTROM, citizens of the United States, residing in Galesburg, in the county of Knox and State of Illinois, have invented a new and useful Improvement in a Combined Lawn-Rake and Grass-Carrier, of which the following is a specification.

This invention relates to lawn-rakes.

The object of our invention is to provide a machine or device of a simple, efficient, and durable construction mounted upon wheels and adapted to be propelled by hand, by means of which lawns, parks, gardens, or meadows may be easily and rapidly raked or combed by hand, and the grass, leaves, weeds, or hay thus raked removed or carried away with facility.

To this end our invention consists in a wheeled frame or truck provided with one or more rakes and rake-heads, and having a propelling-bar furnished with mechanism for operating the rake or rakes, so that the operator or person propelling the machine may operate the rakes while the machine is in motion and without leaving his position.

It further consists in connection with the wheeled rake-frame, rake, and the propelling-bar in providing the rake-frame with a spring-support at one end, so that the operator by depressing or elevating the rake-frame may adjust the position of the rake to inequalities in the surface of the ground as the machine is propelled. By thus mounting a lawn-rake upon a wheeled frame and combining its operating lever or mechanism with the propelling bar or handle of the wheeled frame we are enabled not only to save a great amount of time and labor heretofore required in raking lawns, &c., but our improved rake also serves as a carrier or means for conveying away the grass or débris from the lawn, park, or garden.

Our invention further consists in the novel devices and novel combinations of parts and devices herein shown and described, and more particularly pointed out in the claims.

In the accompanying drawings, which form a part of this specification, and in which similar letters of reference indicate like parts in all the figures, Figure 1 is a perspective view of our combined lawn-rake and grass or hay carrier, the same showing the best form of construction now known to us for embodying our invention in practice. Fig. 2 is a detail front view of the front wheels and propelling-bar. Fig. 3 is a detail view of the rakes and connecting mechanism. Figs. 4, 5, 6, and 7 are detail views showing the construction of the rake-head; and Fig. 8 is a detail view showing the handle or lever for operating the rakes.

In said drawings, A represents the rake-frame furnished, preferably, with three wheels B B and C. The front wheels B B are journaled upon spindles $b\ b$, formed on the ends of the branch or brace arms $d\ d$ of the propelling-bar D. The bar D may be made of any suitable material, but preferably of wood, the forks or arms $d\ d$ being of metal and secured rigidly to the bar by bolts $d'$ or other suitable means. By thus forming the axle-spindles $b\ b$ for the wheels B B directly on the brace or fork arms $d\ d$ of the propelling-bar D we materially simplify and cheapen the construction, as we are thus enabled to dispense with a separate axle-bar for the wheels B B, as well as a front cross-bar for the frame A. The spindles $b\ b$ are connected to the frame A, being inserted through suitable holes in the side bars of said frame near the front end thereof and secured by nuts $b'\ b'$. The propelling-bar D extends upward and backward to the rear end of the machine and is furnished with a cross or handle bar D', so that the machine may be conveniently propelled by hand, the operator walking behind it. The rear end of the propelling-bar is supported by a rod F, connecting the same with the frame A. The supporting-rod F is preferably provided with forks or brace-arms $f f$, the feet of which are rigidly secured to the rear end bar of the frame A by bolts, rivets, or other suitable means. The forks or arms $f f$ are connected together by a cross-bar $f'$, furnished with a hole or bearing $c'$ for the swivel-rod $c$, upon which the rear or swivel wheel C is journaled. The swivel-rod $c$ also has a similar bearing $c^2$ in the rear cross-bar $a$ of the frame A.

The rear wheel C has a spring or yielding connection with the rake-frame A, so that the rear end of said frame may be raised or depressed by the operator lifting or pressing down upon the handle D', as may be required to adjust the height of the rake or rakes to inequalities in the surface of the ground. This spring-connection between the rake-frame and its rear supporting wheel or wheels may be formed in any suitable manner, and any well-known form of spring may be used. We preferably, however, make the spring G in the form of a coil-spring, and we preferably utilize the swivel-rod $c$ as the means of mounting it or securing it in place between the frame A and wheel C, the rod $c$ being furnished with a collar or shoulder $c^3$ for one end of the spring to bear against. The upper end of the spring bears against the cross-bar $f'$ on the bar F.

The frame A may be furnished with one or more rakes. Preferably, however, we employ two rakes, though a greater or less number may be used. Each rake consists (or preferably consists) of a rotatable rake-head H, pivoted at its ends to the side bars of the frame A and provided with curved spring-steel rake-teeth $h$. The rake or rakes are operated by a device K, preferably a handle-lever pivoted on and carried by the propelling-bar D, so that the operator may raise or lower the rakes to unload or load the same while the machine is in motion and without leaving his position. We prefer to use a lever K for operating the rakes, though other suitable devices may be employed for this purpose. Any suitable means may be employed for communicating the motion of the rake-operating lever or device K to the rake-heads. That which we prefer to use consists in a connecting-rod $k$, pivoted at one end to the lever K, near the middle thereof, and at the other end to the operating-arm $h'$, which is secured rigidly to the rotatable rake-head H. Where two or more rakes are employed, connection is made from the operating-arm $h'$ of one to the operating-arm $h'$ of the succeeding one or ones by a connecting-rod $h^2$. To adjust the throw of the rakes, the connecting-rod $h^2$ is or should be provided with a number of pivot-holes $h^3$ for the connecting-rod.

To automatically lock the rakes in their elevated or depressed position, the operating-lever K is arranged or adapted to pass the center line when it is turned forward to set the rakes in the loading or operating position, and also when it is turned backward to set the rakes in their unloading position. This result may be conveniently effected by simply employing a raised bracket $k^2$ on the propelling-bar D for pivoting the operating-lever K, so that when the lever K is turned either forward, as shown in Fig. 1, or backward, as shown in Fig. 8, the line of draft on the connecting-rod $k$ will pass below the pivot of the lever K, and thus cause the weight of the rake itself to hold the lever K in its proper position for loading or unloading the rakes. By this simple means the rakes may be securely locked in their up or down position, so that the rake-operating lever will require no attention from the operator in the ordinary movement of the machine.

The cross-bar $a$ of the frame A is furnished with straight wire teeth $a^2$ to clean the rake-teeth $h$ when the rakes are raised, and thus facilitate the discharge of the material therefrom. The cleaning-teeth $a^2$ for the front rake may be secured to the rear rake-head H, as shown.

The rake-head H, to which the teeth $h$ are secured, is preferably made of two parts H and H', the part H' being furnished with a flange $h^6$, with holes $h^4$, and with grooves $h^5$ to receive the shanks of the rake-teeth. The part H is furnished with corresponding grooves $h^7$ to receive the rake-teeth, and the two parts H and H' are rigidly secured together to clamp the rake-teeth between them by means of screws, bolts, or other suitable devices $h^8$.

In operation, the rakes being set in the loading or gathering position, the operator simply propels the machine over the lawn or surface to be raked until the rakes are loaded, and then he propels the machine to the place where it is desired to deposit the rakings, and then by simply moving the operating-lever K he raises the rakes and discharges the load, all of which may be done while the machine is in motion.

We claim—

1. The combined lawn-rake and grass-carrier consisting in a wheeled frame having front and rear wheels and furnished with a propelling-bar provided with spindles for the front-wheels, and connected to said frame near the front end thereof and extending upward and backward to the rear of said frame for operating the same by hand, and a rotatable rake having spring-teeth mounted upon said frame between said front and rear wheels, said propelling-bar being also connected to the rear end of said frame, so that said rake may be elevated to its position as a grass-carrier or depressed to its raking position by elevating or depressing the rear end of said frame, said frame having a yielding connection with its rear supporting-wheel, substantially as specified.

2. In a lawn-rake and grass-carrier, the combination, with a wheeled frame having front and rear wheels and furnished with a propelling-bar connected thereto near the front end thereof and extending upward and backward to the rear of said frame, said propelling-bar being also connected with said frame near the rear end thereof, said rear wheel having a swivel and a yielding spring-connection with said frame, of a rake-head consisting of a pair of grooved clamp-bars mounted pivotally upon said frame between said wheels and provided with spring rake-teeth clamped between said clamp-bars, and a device or mechanism mounted upon said propelling-bar for operating and discharging the rake, said propelling-bar serving to raise or depress the rear end of the rake-frame, so that the rake may operate as a grass-carrier as well as a rake, substantially as specified.

3. In a lawn-rake and grass-carrier, the combination of a rake-frame provided with front and rear wheels, said rear wheel having a swivel-connection with said frame, a pair of rake-heads pivoted to said frame between said wheels and constructed of a pair of grooved clamp-bars having operating-arms connected together and operated simultaneously, said rake-head clamp-bars being provided with spring rake-teeth, of a propelling-bar extending upward and backward to the rear of said frame, and a lever and connecting mechanism mounted upon said propelling-bar for operating the rakes, substantially as specified.

4. In a lawn-rake and grass-carrier, the combination, with a rake and a rake-frame provided with front and rear wheels, of a propelling-bar, a lever, and connecting mechanism for operating the rake, said rake-frame having a spring or yielding connection with its rear supporting-wheel, so that the operator may adjust the position of the rakes to inequalities in the ground by lifting or pressing down upon said propelling-bar, substantially as specified.

5. The combination, with rake-frame A, furnished with wheels B B, of a propelling-bar D, pivotally connected with said frame by two brace-arms $d\ d$, provided with spindles $b\ b$ for said wheels B B, said spindles being integral with said brace-arms and formed by bends therein, and a rake mounted upon said frame, substantially as specified.

6. The combination, with a rake and rake-frame A, mounted upon wheels B B and C, of a propelling-bar D, extending upward and backward to the rear end of said frame and furnished with a handle D', and a supporting-bar F, connecting the rear end of said bar D with said frame A, said wheel C having a spring and swivel connection with said frame A, substantially as specified.

7. The combination, with rake-frame A, of wheels B B, propelling-bar D, brace-arms $d\ d$, having spindles $b\ b$, supporting-bar F, having brace-arms $f\ f$ and cross-bar $f'$, wheel C, having swivel-rod $c$, spring G, a rake mounted upon said frame A, and a rake-operating lever K, pivoted to said propelling-bar, substantially as specified.

8. The combination, with a wheeled frame A, having front wheels B B and rear swivel-wheel C, of a propelling-bar D, connected to said frame A near the front end thereof, and being also connected with the rear end of said frame, a rotatable rake-head H, pivoted on said rake-frame between said front and rear wheels and having spring rake-teeth, an operating-lever K, mounted on said propelling-bar, and a connecting-rod from said lever to the operating-arm of the rake-head, said rear wheel having a yielding connection with said frame, said propelling-bar serving also to raise or depress the rear end of the rake-frame, so that the rake may serve as a grass-carrier as well as a rake, substantially as specified.

9. The combination, with a wheeled rake-frame having a propelling-bar extending upward and backward to the rear of the same and pivotally connected therewith, of rotatable rake-heads constructed of two grooved clamp-bars furnished with spring-steel rake-teeth and mounted on said rake-frame and having an operating-arm $h'$, a rake-operating lever K mounted on said propelling-bar, a connecting-rod $k$, pivoted at one end to said lever K, and at the other to said operating-arm $h'$, and a rod $h^2$, connecting said rake-arms $h'\ h'$, said operating-lever being pivoted to a raised bracket $k^2$, and thus adapted to lock the rake in its raised or lowered position by passing the center line of its pivot, so that the weight of the rake itself will hold the lever in position, substantially as specified.

10. The combination, with a wheeled rake-frame A, having a propelling-bar D, extending upward and backward to the rear end of said frame and furnished with a handle, of two rakes and rake-heads H H, pivoted thereto and provided with operating-arms $h'\ h'$, connected by a rod $h^2$, a propelling-bar D, the operating-lever K, and connecting-rod $k$, whereby said rakes are simultaneously raised and lowered, substantially as specified.

11. The combination, with a rake-frame having front and rear wheels, of two rakes and rake-heads H H, pivoted thereto and provided with operating-arms $h'\ h'$, connected by a rod $h^2$, a propelling-bar, the operating-lever K, and connecting-rod $k$, said frame having a spiral spring-bearing connected with its rear wheel by means of the pivot upon which the frame moves upward or downward as depressed or elevated to enable the operator to adjust the rakes to inequalities in the ground, substantially as specified.

CHARLES O'NEILL.
JOHN LINSTROM.

Witnesses:
  J. C. O'SHEA,
  J. H. FITZGERALD.